(12) United States Patent
Fleischhacker

(10) Patent No.: US 10,549,892 B2
(45) Date of Patent: Feb. 4, 2020

(54) CONTAINER AND LIQUID DISPENSING APPARATUS

(71) Applicant: Plastipak Packaging, Inc., Plymouth, MI (US)

(72) Inventor: Kyle Fleischhacker, Dearborn, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 15/184,710

(22) Filed: Jun. 16, 2016

(65) Prior Publication Data

US 2016/0368675 A1 Dec. 22, 2016

Related U.S. Application Data

(60) Provisional application No. 62/180,899, filed on Jun. 17, 2015.

(51) Int. Cl.
*B65D 47/18* (2006.01)
*B65D 51/24* (2006.01)
*B65D 41/04* (2006.01)
*B65D 47/08* (2006.01)

(52) U.S. Cl.
CPC ......... *B65D 47/18* (2013.01); *B65D 41/0442* (2013.01); *B65D 51/245* (2013.01); *B65D 47/08* (2013.01)

(58) Field of Classification Search
CPC . B01L 3/0282; B65D 23/102; B65D 41/0442; B65D 47/08; B65D 47/18; B65D 51/245; A61M 3/0262; A61M 1/0072; A61M 31/00; A61M 25/10183; A61M 2205/075
See application file for complete search history.

(56) References Cited

U.S. PATENT DOCUMENTS

| | | | | |
|---|---|---|---|---|
| 531,133 | A * | 12/1894 | Pomeroy | B01L 3/0282 141/24 |
| 2,492,326 | A * | 12/1949 | Scotti | A61M 3/0262 206/364 |
| 2,772,704 | A * | 12/1956 | McConnell | B01L 3/0282 141/24 |
| 2,877,810 | A * | 3/1959 | Zackheim | B01L 3/0282 132/74.5 |
| 3,189,223 | A * | 6/1965 | Mackal | B65D 47/18 222/1 |
| 3,783,996 | A * | 1/1974 | Gerard | A61M 3/0262 206/364 |
| 3,896,974 | A * | 7/1975 | McIntosh | B65D 41/18 215/228 |

(Continued)

*Primary Examiner* — David P Angwin
*Assistant Examiner* — Bob Zadeh

(57) ABSTRACT

A plastic container and liquid dispenser apparatus includes a plastic container and a liquid dispenser. The plastic container includes a base portion, a body portion, an interior of the plastic container, and a dispenser opening. The liquid dispenser has a hollow cap and a pick-up tube. The liquid dispenser is disposed in the dispenser opening of the plastic container. The pick-up tube extends inside the body portion of the plastic container and is fixed to the hollow cap. Thus, the interior of the plastic container is in communication with the interior of the hollow cap through the pick-up tube.

10 Claims, 7 Drawing Sheets

(56) References Cited

U.S. PATENT DOCUMENTS

| | | | | |
|---|---|---|---|---|
| 4,804,097 | A | * | 2/1989 | Alberghini ............ B65D 23/102 |
| | | | | 215/384 |
| 6,050,434 | A | * | 4/2000 | McNab .............. B65D 47/0809 |
| | | | | 215/235 |
| 2004/0129738 | A1 | * | 7/2004 | Stukas ................. B65D 47/123 |
| | | | | 222/420 |
| 2011/0108160 | A1 | * | 5/2011 | Lee ........................ A45D 34/02 |
| | | | | 141/24 |
| 2011/0240674 | A1 | * | 10/2011 | Pai ...................... A61M 3/0262 |
| | | | | 222/158 |
| 2011/0297703 | A1 | * | 12/2011 | Wilson ................... B65D 47/18 |
| | | | | 222/212 |
| 2016/0368675 | A1 | * | 12/2016 | Fleischhacker ....... B01L 3/0282 |
| 2017/0079407 | A1 | * | 3/2017 | Chen ..................... A45D 34/04 |

\* cited by examiner

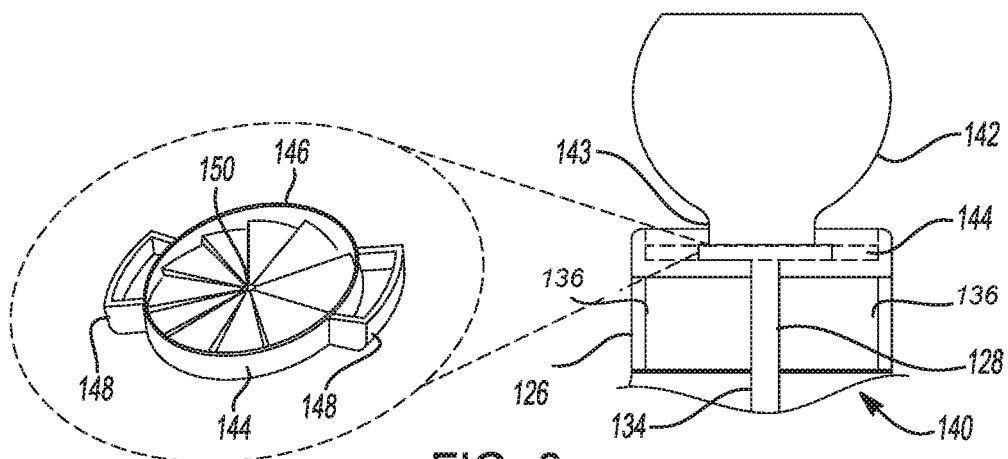
FIG. 9
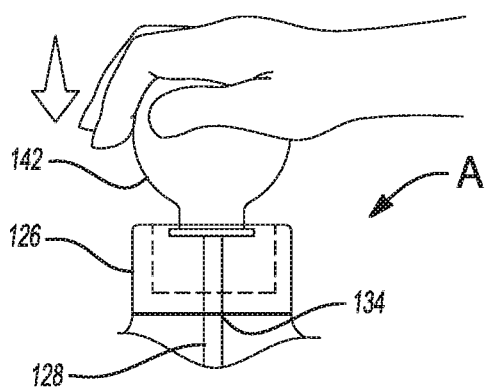
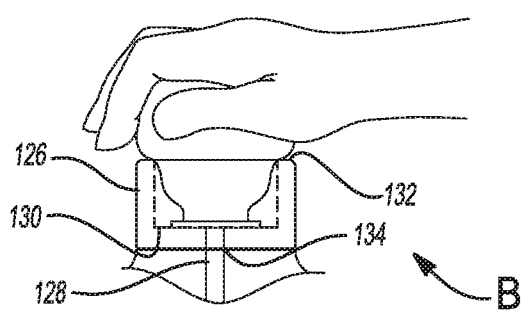
FIG. 10
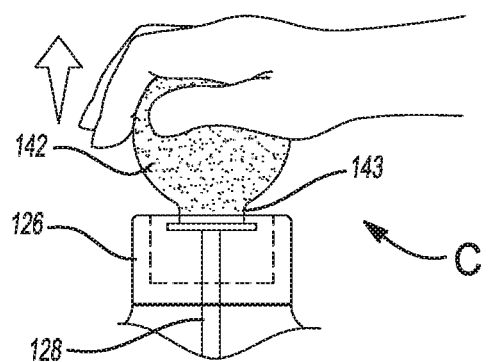

CONTAINER AND LIQUID DISPENSING APPARATUS

CROSS REFERENCE TO RELATED APPLICATIONS

This application claims benefit of U.S. Provisional Application No. 62/180,899 filed Jun. 17, 2015. The disclosure of the above application is incorporated herein by reference.

FIELD

The present disclosure relates to blown plastic containers, and more particularly to plastic containers having a liquid dispensing apparatus.

BACKGROUND

The statements in this section merely provide background information related to the present disclosure and may or may not constitute prior art.

Plastic containers have been used to package liquids intended for various purposes including, for example, consumable beverages and cleaning detergents among other common purposes. Some plastic containers have been improved to include dispensing systems thus making it easier for the user to remove the liquid from the container. Liquid laundry detergents, in particular, have been packaged into newly designed plastic containers that have been constantly increasing in volume and weight. The increased size and weight of packaging creates a new set of challenges that heightens the need to improve dispensing systems. A further challenge to domestic chores is to improve efficiency while becoming more environmentally sensitive. Using the correct amount of liquid for a particular purpose lessens the effect on the environment while accomplishing accurately dispensing the proper amount of liquid.

While current plastic container dispensing systems are useful for their intended purpose, there is room in the art for an improved plastic container dispensing system that reduces or eliminates the need to lift heavy containers, improves efficiency, and enhances environmental stewardship.

SUMMARY

A plastic container and liquid dispenser apparatus is provided in an aspect of the present invention. The plastic container and liquid dispenser apparatus includes a plastic container and a liquid dispenser. The plastic container includes a base portion, a body portion, an interior of the plastic container, and a dispenser opening. The liquid dispenser has a hollow cap and a pick-up tube. The liquid dispenser is disposed in the dispenser opening of the plastic container. The pick-up tube has a hollow bore, a first end, and a second end opposite the first end. The first end extends inside the body portion of the plastic container proximate the base portion. The second end is fixed to the hollow cap, and the interior of the plastic container is in communication with an interior of the hollow cap through the first end, the hollow bore, and the second end of the pick-up tube.

In one aspect of the present invention, the surface of the hollow cap includes measured gradation marks.

In another aspect of the present invention, the measured gradation marks on the hollow cap include marks denoting between about one (1) and two (2) ounce measures.

In yet another aspect of the present invention, the hollow cap is molded from a non-opaque material.

In yet another aspect of the present invention, the hollow cap is a squeezable ball.

In yet another aspect of the present invention, the dispenser opening of the plastic container includes a threaded vertical wall. The liquid dispenser includes a threaded collar. The liquid dispenser is secured to the dispenser opening of the plastic container via the threaded vertical wall and the threaded collar.

In yet another aspect of the present invention, the plastic container and liquid dispenser apparatus further includes a rigid cover having a hinge and a retainer portion, and wherein the rigid cover is rotatably connected to the dispenser opening via the hinge and selectively encloses the dispenser opening to secure the hollow ball in the dispenser opening.

In yet another aspect of the present invention, the hollow cap is rigid. The dispensing apparatus further includes a locking flange fixed to the hollow cap. The dispensing apparatus draws liquid from the interior of the plastic container into the hollow cap as the dispensing apparatus is moved through each of three positions.

In yet another aspect of the present invention, the first end of the pick-up tube has a smaller diameter than the second end of the pick-up tube.

In yet another aspect of the present invention, the body portion includes grip indentations.

In yet another aspect of the present invention, the interior of the plastic container further includes a siphon tube having an open first and second end. The first end is disposed proximate the base of the plastic container. The second end is fixed to the dispenser opening. The pick-up tube of the liquid dispenser is disposed and sealed into the siphon tube.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9 is a close-up cross section of the plastic container and liquid dispensing apparatus of FIG. 8, according to the principles of the present disclosure;

FIG. 10 is a side view of a portion of the plastic container and liquid dispensing apparatus of FIG. 8 in various stages of operation, in accordance with the principles of this present disclosure;

DETAILED DESCRIPTION

Figure 1:
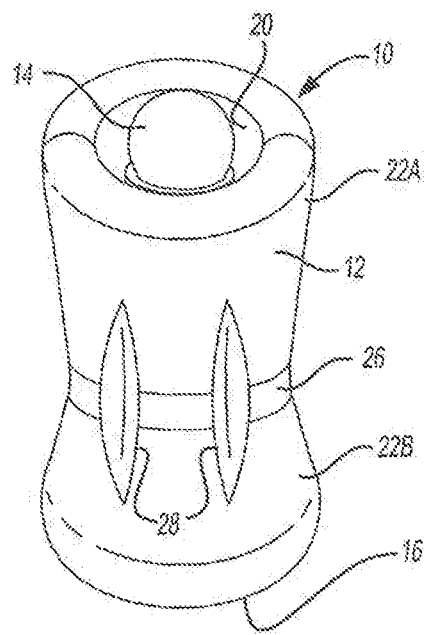
FIG. 1 is a perspective view of an exemplary plastic container having a liquid dispensing apparatus, according to the principles of the present disclosure.
Figure 2:
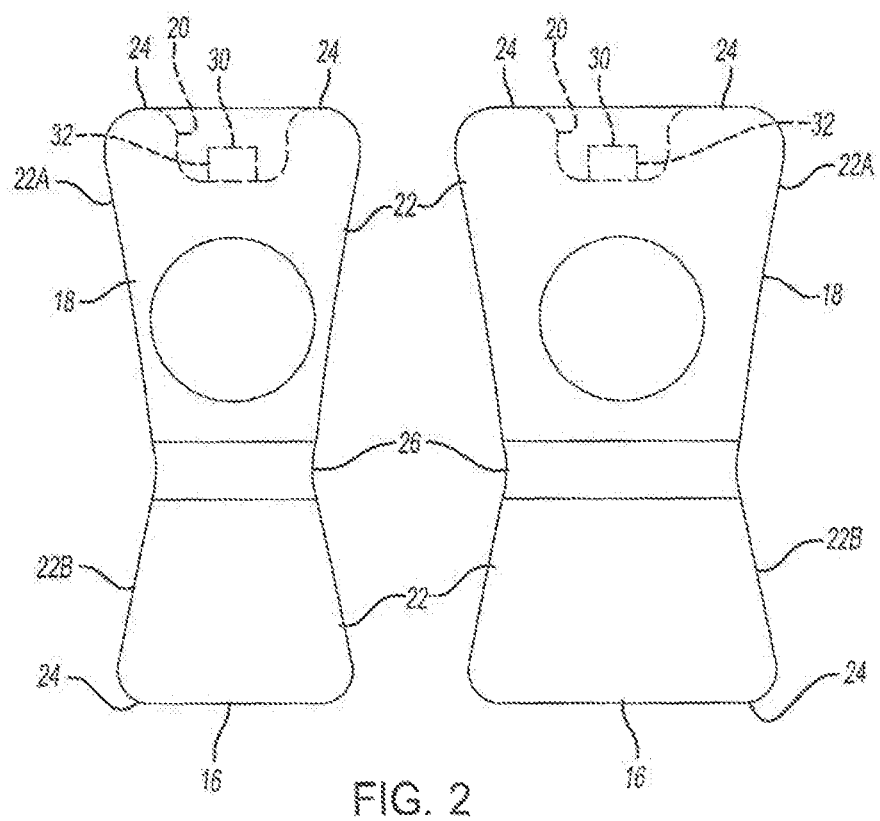
FIG. 2 is a front or side view of a pair of exemplary plastic containers having a liquid dispensing apparatus, according to the principles of the present disclosure.

The following description is merely exemplary in nature and is not intended to limit the present disclosure, application, or uses.

With reference to FIGS. 1-4, a plastic liquid container and dispensing apparatus 10 is illustrated and will now be described. The plastic liquid container and dispensing apparatus 10 includes a plastic container 12 and a dispensing apparatus 14. The plastic container 12 includes a base 16, a body 18, and a dispensing portion 20. The body 18 is generally cylindrical including a combination of frusto conical shapes 22, corners 24 having a gentle radius, a cylindrical label portion 26, and a pair of vertical grip indentations 28. More specifically, a first of the frusto conical shapes 22A is inversely stacked upon a second of the frusto conical shapes 22B and joined by the label portion 26. The grip indentations 28 are disposed proximate the label portion 26 to provide a grip for handling the plastic container 12. The dispensing portion 20 of the plastic container 12 is disposed at the top of the plastic container 12 in the form of a hemispherical indentation and includes a cylindrical dispenser opening 30 having a threaded vertical wall 32.

Figure 3:
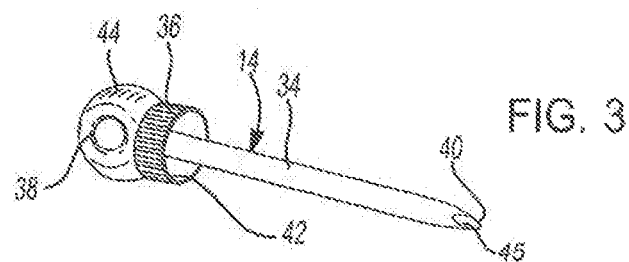
FIG. 3 is a perspective view of a liquid dispensing apparatus of the plastic containers shown in FIGS. 1 and 2, in accordance with the principles of the present disclosure.
Figure 4:
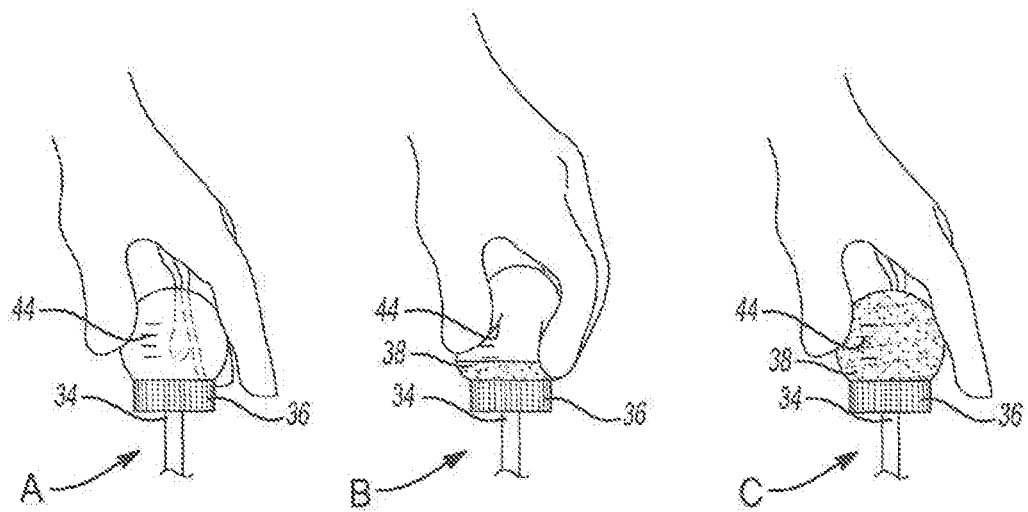
FIG. 4 is a progressive view of a liquid dispensing apparatus of a plastic container at various stages of operation, in accordance with the principles of this present disclosure.

The dispensing apparatus 14, shown in more detail in FIGS. 3 and 4, is disposed in the dispenser opening 30 of the plastic container 12. The dispensing apparatus 14 includes a pick-up tube 34, a threaded collar 36, and a collapsible portioned squeeze ball 38. The pick-up tube 34 is a gradually narrowing tube having a first end 40 and a second end 42 opposite the first end 40. The first end 40 has an opening 45 so that the interior of the pick-up tube 34 is in communication with the interior of the plastic container 12. The second end 42 is captured or retained by the threaded collar 36 and includes an opening 46 to the interior of the pick-up tube 34. The squeeze ball 38 includes a hollow interior, a collar, and a plurality of gradation markings 44. For example, the collar of the squeeze ball 38 is captured by the threaded collar 36 so that the interior of the pick-up tube 34 is in communication with the interior of the squeeze ball 38. The plurality of gradation markings 44 are disposed on the exterior of the squeeze ball 38 and mark the proper volume of liquid required for a particular application. The gradation markings 44 are arranged to provide a dose volume of between about one (1) and about two (2) oz. of liquid. In addition, the squeeze ball 38 may be molded with a non-opaque material so that the liquid level in the squeeze ball 38 can be determined.

Referring now to FIG. 4, three operating stages A, B, C of the dispensing apparatus 14 are shown and will now be described. In a first of the three operating stages A, the collar 36 of the dispensing apparatus 14 is threaded onto the dispenser opening 30 of the plastic container 12. In a second of the three operating stages B, the squeeze ball 38 is compressed to force air down the pick-up tube 34 and into the plastic container 12. In a third of the three operating stages C, the squeeze ball 38 is released and expands to draw a measured dose of liquid from the plastic container 12, up the pick-up tube 34 and into the squeeze ball 38.

Figure 5:
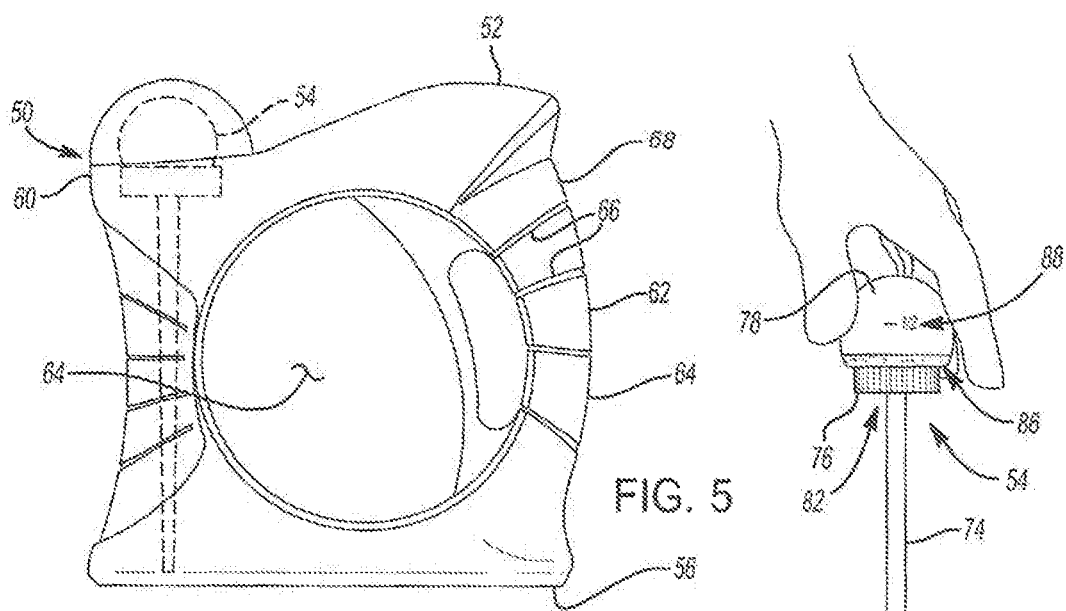
FIG. 5 is a side view of an exemplary plastic container having a liquid dispensing apparatus, according to the principles of the present disclosure.
Figure 6:
FIG. 6 is a side view of a liquid dispensing apparatus of the plastic container shown in FIG. 5, in accordance with the principles of the present disclosure.
Figure 7:
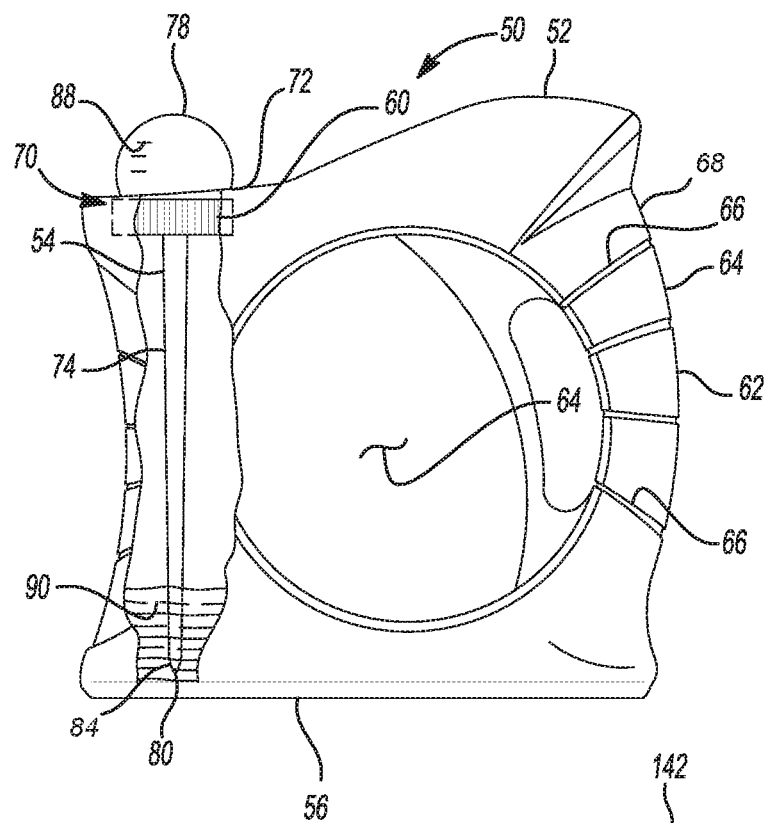
FIG. 7 is a partially cut-away side view of an exemplary plastic container showing the liquid dispensing apparatus of FIG. 6, in accordance with the principles of the present disclosure.

Turning now to FIGS. 5-7, another example of a plastic container and dispensing apparatus 50 is illustrated and will now be described. The plastic liquid container and dispensing apparatus 50 includes a plastic container 52 and a dispensing apparatus 54. The plastic container 52 includes a base 56, a body 58, and a dispensing portion 60. The body 58 may have a generally aesthetic design; however, most examples will include a handle 62 and a label portion 64. More specifically, the handle 62 includes integrated ribs 66 and a radius portion 68. The integrated ribs 66 provide strength to the handle 62 and the radius portion 68 follows the shape of the label portion 64. The dispensing portion 60 of the plastic container 52 is disposed at the top of the plastic container 52 opposite the handle 62 and includes a cylindrical dispensing opening 70 having a threaded vertical wall 72.

The dispensing apparatus 54, shown in more detail in FIG. 6, is disposed in the dispensing opening 60 of the plastic container 52. The dispensing apparatus 54 includes a pick-up tube 74, a threaded collar 76, and a collapsible squeeze ball 78. The pick-up tube 74 is a gradually narrowing tube having a first end 80 and a second end 82 opposite the first end 80. The first end 80 has an opening 84 so that the interior of the pick-up tube 74 is in communication with the interior of the plastic container 52. The second end 82 is captured or retained by the threaded collar 76 and includes an opening 86 to the interior of the pick-up tube 74. The squeeze ball 78 includes a hollow interior, a collar, and a plurality of gradation markings 88. For example, the collar of the squeeze ball 78 is captured by the threaded collar 76 so that the interior of the pick-up tube 74 is in communication with the interior of the squeeze ball 78. The plurality of gradation markings 88 are disposed on the exterior of the squeeze ball 78 and mark the proper volume of liquid required for a particular application. The squeeze ball 78 may be molded with a non-opaque material so that the liquid level in the squeeze ball 78 can be determined, however, other materials may be used for the squeeze ball 78 without departing from the scope of the invention. As detailed in FIG. 7, the plastic container 52 is shown partially cut-away. In this view, it is revealed that the first end 80 of the pick-up tube 74 of the dispensing apparatus 54 terminates in close proximity to the base 56 of the container 52. In this regard, the first end 80 of the pick-up tube 74 is below a liquid 90 level of the container 52 until there is minimal liquid left in the container thus displaying that the pick-up tube 74 is capable of retrieving nearly all of the liquid out of the plastic container 52.

Figure 8:
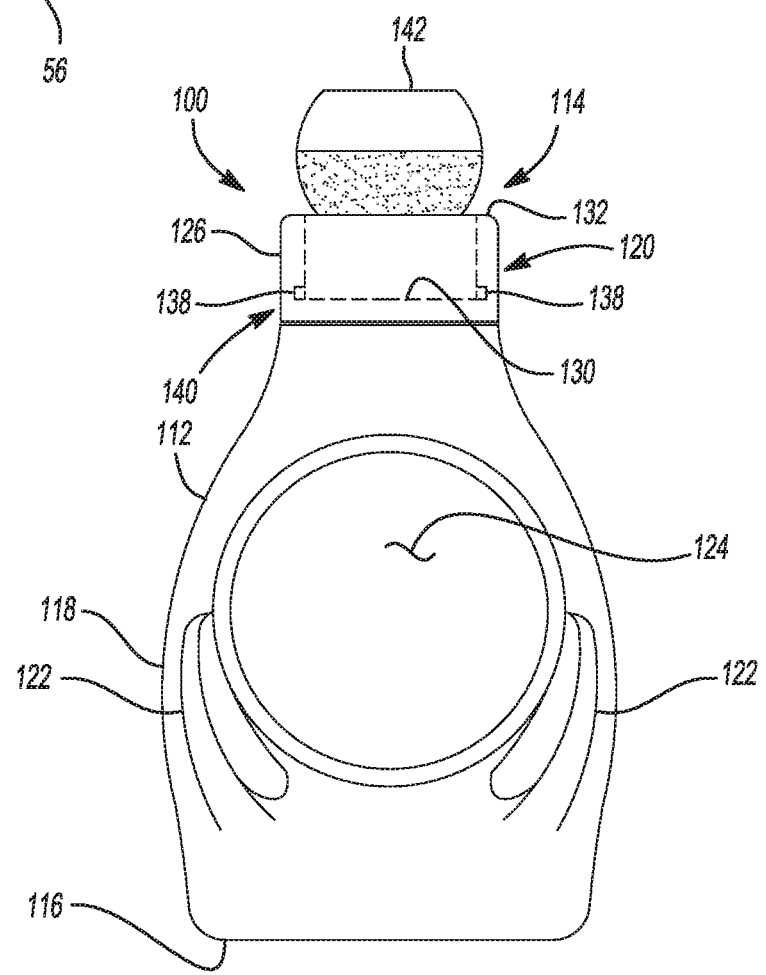
FIG. 8 is a side view of an exemplary plastic container having a liquid dispensing apparatus, according to the principles of the present disclosure.
Figure 11:
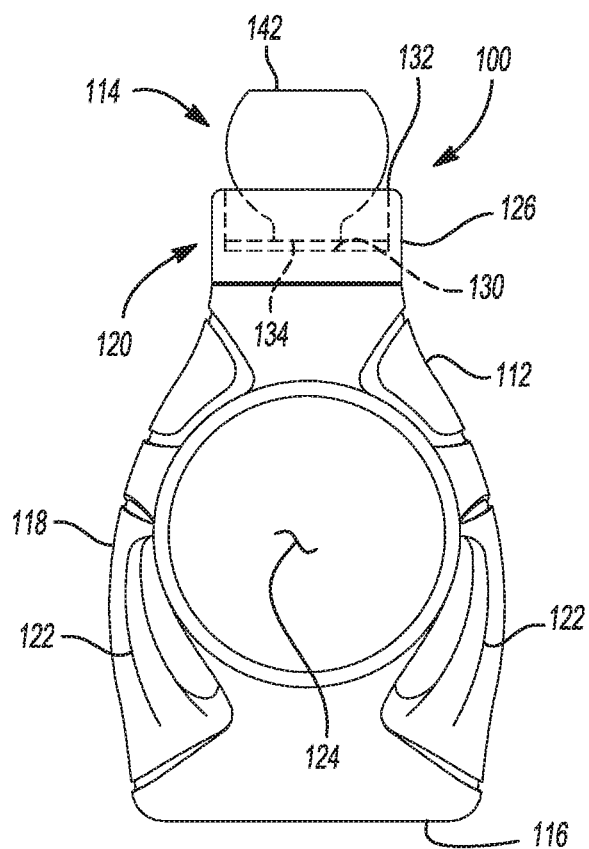
FIG. 11 is a side view of an exemplary plastic container having a liquid dispensing apparatus, according to the principles of the present disclosure.

Turning now to FIGS. 8-11, another example of a plastic liquid container and dispensing apparatus 100 is illustrated and will now be described. The plastic container and dispensing apparatus 100 is shown in FIGS. 8 and 11 and includes a plastic container 112 and a dispensing apparatus 114. The plastic container 112 includes a base 116, a body 118, and a dispensing portion 120. The body 118 expands slightly outward from the base 116 and narrows to the dispensing portion 120 and includes a plurality of grip indentations 122 and a label portion 124. The grip indentations 122 are disposed proximate the sides of the plastic container 112 and partially surrounds the label portion 124 of the body 118 to provide a grip for handling the plastic container 112. The dispensing portion 120 of the plastic container 112 is disposed at the top of the plastic container 112 and includes a collar 126 and a tube 128 (shown more extensively in FIGS. 9 and 10). The collar 126 has a cylindrical shape and a partially hollowed interior forming collar base 130 and an outer wall 132. The collar 126 includes a small port 134, pair of vertical grooves 136, and a horizontal slot 138 that forms a portion of a locking mechanism 140 which will be explained further below. The tube 128 is disposed in the port 134 of the base 130 of the collar 126 and extends partially vertically out of the base 130 of the collar 126 and into the body 118 of the container 112 so that the tube 128 ends proximate the base 116 on the interior of the plastic container 112.

Shown in more detail in FIGS. 9 and 10, the dispensing apparatus 114 is illustrated in detail and shown in a plurality of positions. The dispensing apparatus 114 includes a dosing cap 142 and a locking flange 144. More specifically, the dosing cap 142 is a bulb-shaped vessel having an open end 143. The locking flange 144 is formed from an annular member 146, a pair of locking tabs 148 extending radially outward from the annular member 146, and a plurality of flexible overlapping tabs 150 extending radially inward from the annular member 146. The locking flange 144 is fixed to the open end 143 of the dosing cap 142 and is configured to perform two duties. The first is to lock the dispensing apparatus 114 into a locked position engaging the locking mechanism 140 by fitting the locking tabs 148 into the vertical grooves 136 of the collar 126, forcing the dispensing apparatus 114 in the downward direction until the locking flange 144 is in contact with the collar base 130, and twisting or rotating the dispensing apparatus 114 to slide the locking tabs 148 into the horizontal slot 138 of the collar 126 thus preventing the dispensing apparatus from returning to a first, unlocked position.

The second function or duty of the locking flange 144 is to receive the tube 128 from the plastic container 112 so that an open end 152 of the tube 128 extends between the overlapping tabs 150 into the dosing cap 142. In this manner, the liquid from the plastic container 112 is delivered to the dosing cap 142 via the tube 128 passing through the overlapping tabs 150 of the locking flange 144.

Referring now to FIG. 10, three operating positions A, B, C of the dispensing apparatus 114 are shown and will now be described. In a first of the three operating positions A, the end 143 of the dispensing apparatus 114 is disposed near the top of the collar 126 and the tube 128 has slightly penetrated the overlapping tabs 150 of the locking flange 144. The locking flange 144 is in contact with the outer wall 132 of the collar creating an airtight seal. In a second of the three operating positions B, the end 143 of the dispensing apparatus 114 has been pressed downward towards the base 130 of the collar 126 thus forcing the air contained by the seal between the locking flange 144 and the collar 126 into the dosing cap 142 and down the tube 128 into the plastic container 112. In a third of the three operating position C, the dosing cap 142 is forced upward from the base 130 of the collar 126 and draws a measured dose of liquid 154 from the plastic container 112, up the tube 128 and into the dosing cap 142. The measured does is arranged to provide a dose volume of between about one (1) and about two (2) oz. of liquid.

Figure 12:
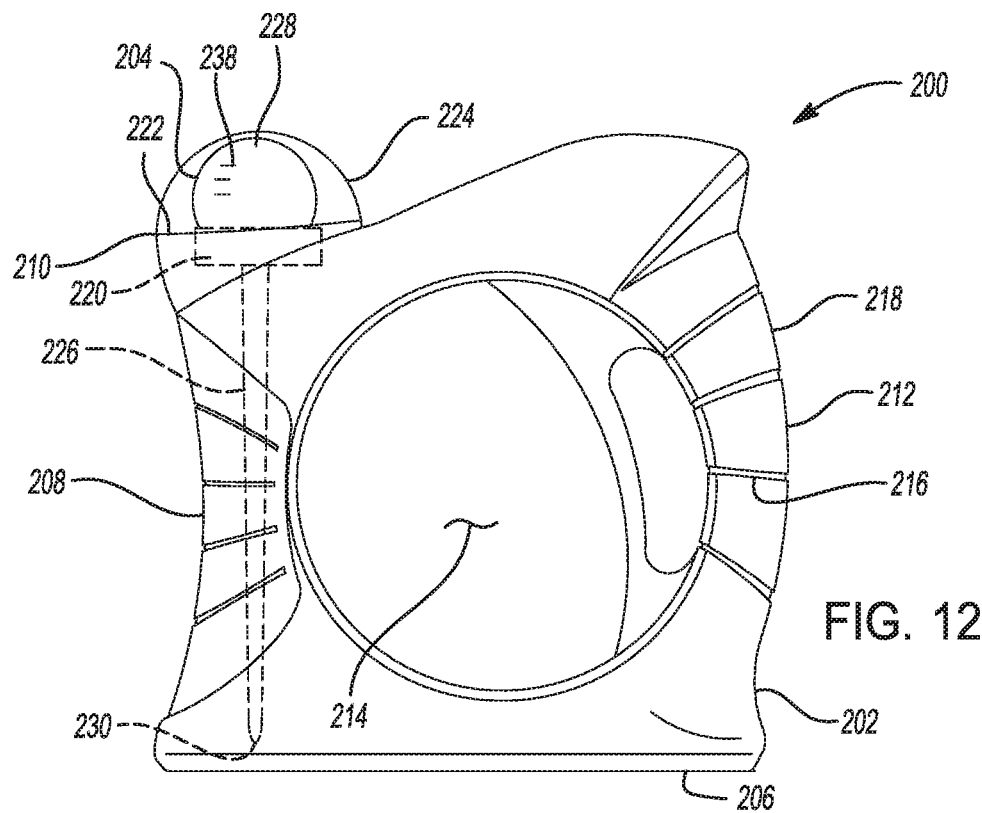
FIG. 12 is a side view of an exemplary plastic container having a liquid dispensing apparatus, according to the principles of the present disclosure.
Figure 13:
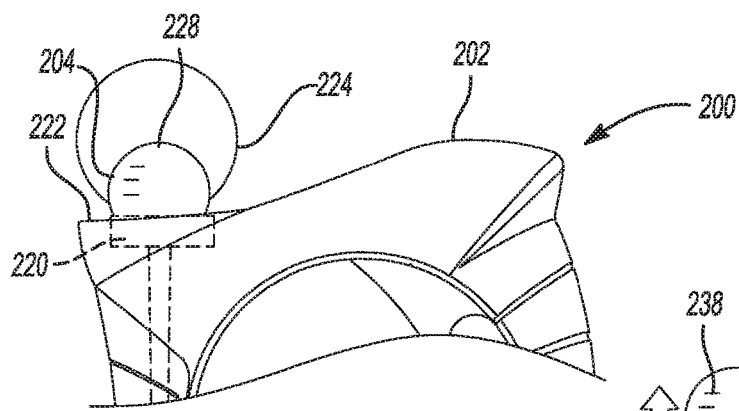
FIG. 13 is a partial side view of the exemplary plastic container and liquid dispensing apparatus of FIG. 12, according to the principles of the present disclosure.
Figure 14:
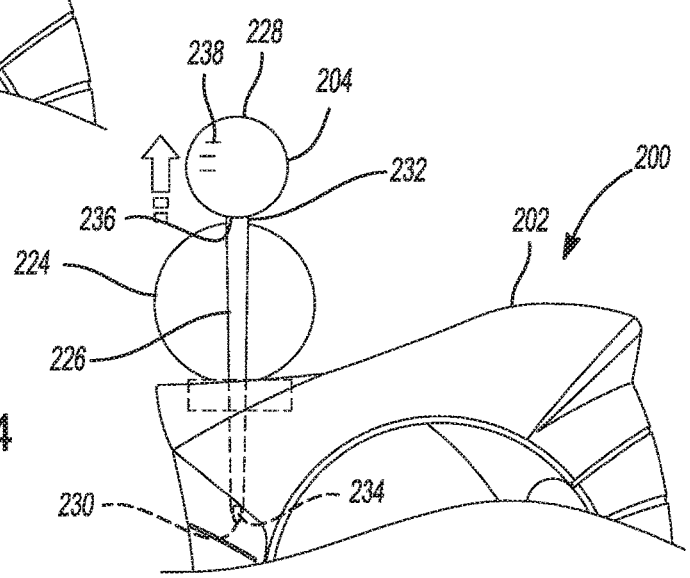
FIG. 14 is a partial side view of the exemplary plastic container and liquid dispensing apparatus of FIG. 12, according to the principles of the present disclosure.

Turning now to FIGS. 12-14, another example of a plastic container and dispensing apparatus 200 is illustrated and will now be described. The plastic liquid container and dispensing apparatus 200 includes a plastic container 202 and a dispensing apparatus 204. The plastic container 202 includes a base 206, a body 208, and a dispensing portion 210. The body 208 may have a generally aesthetic design; however, most examples will include a handle 212 and a label portion 214. More specifically, the handle 212 includes integrated ribs 216 and a radius portion 218. The integrated ribs 216 provide strength to the handle 212 and the radius portion 218 follows the shape of the label portion 214. The dispensing portion 210 of the plastic container 202 is disposed at the top of the plastic container 202 opposite the handle 212 and includes a dispensing opening 220 having a vertical wall 222 and a cap 224 hinged to the dispensing portion 210 of the plastic container 202 and operable to snap tight to the dispensing portion 210 and swing clear of the dispensing portion 210.

The dispensing apparatus 204 is disposed in the dispensing opening 220 of the plastic container 202. The dispensing apparatus 204 includes a pick-up tube 226 and a collapsible portioned squeeze ball 228. The pick-up tube 226 is a gradually narrowing tube having a first end 230 and a second end 232 opposite the first end 230. The first end 230 has an opening 234 so that the interior of the pick-up tube 226 is in communication with the interior of the plastic container 202. The second end 232 is captured or retained by squeeze ball 228 and includes an opening 236 to the interior of the pick-up tube 226. The squeeze ball 228 includes a hollow interior and a plurality of gradation markings 238. For example, the collar of the squeeze ball 228 captures second end 232 of the pick-up tube 226 so that the interior of the pick-up tube 226 is in communication with the interior of the squeeze ball 228. The plurality of gradation markings 238 are disposed on the exterior of the squeeze ball 228 and mark the proper volume of liquid required for a particular application. The squeeze ball 228 may be molded with a non-opaque material so that the liquid level in the squeeze ball 228 can be determined. The first end 230 of the pick-up tube 226 of the dispensing apparatus 204 comes to rest in close proximity to the base 206 of the container 202. In this regard, the first end 230 of the pick-up tube 226 is below a liquid level of the plastic container 202 until there is very little liquid left in the container thus displaying that the pick-up tube 226 is capable of retrieving nearly all of the liquid out of the container 202.

Figure 15:
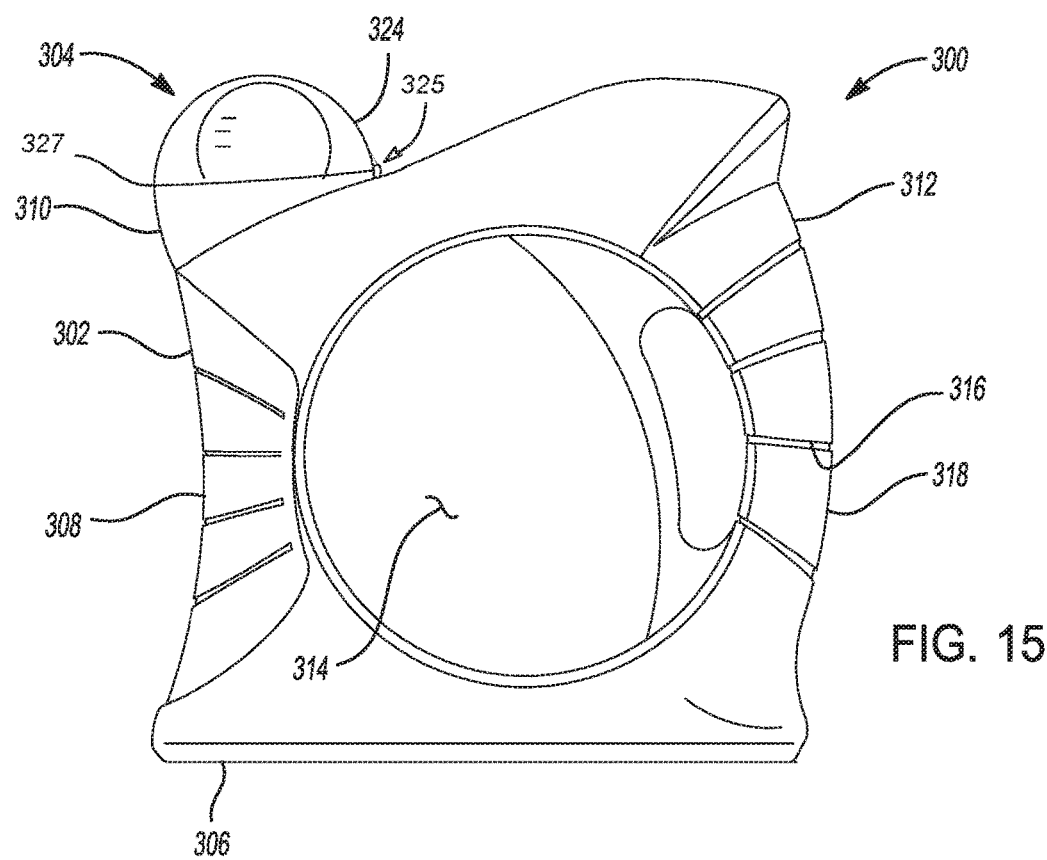
FIG. 15 is a side view of an exemplary plastic container having a liquid dispensing apparatus, according to the principles of the present disclosure.
Figure 16:
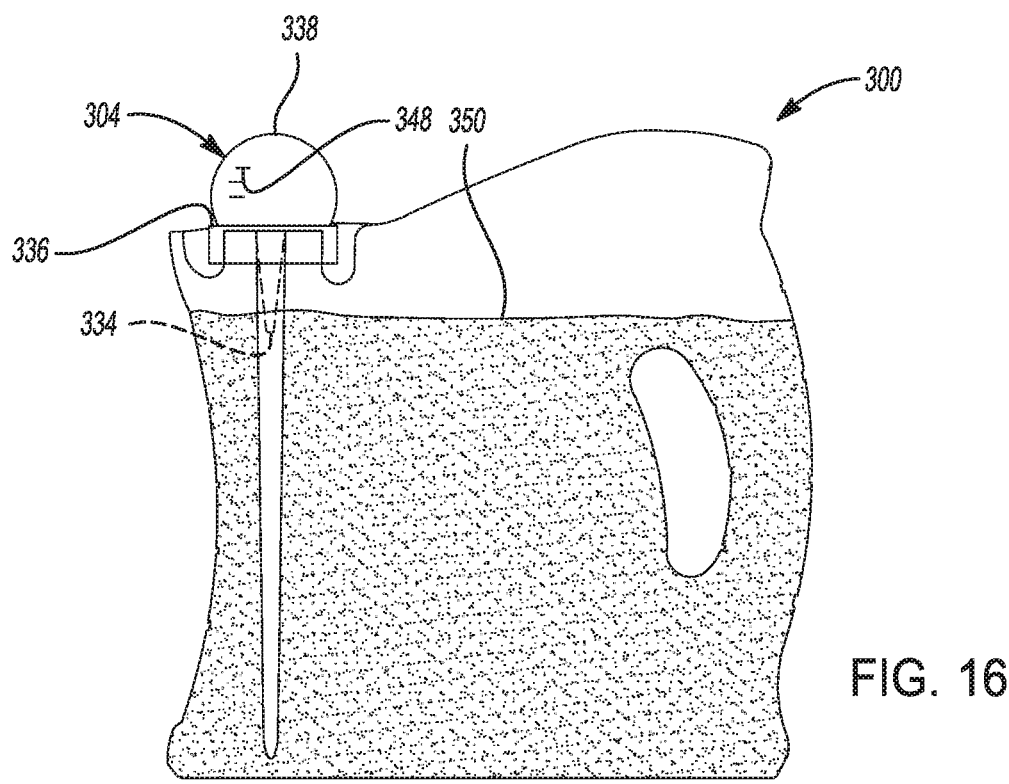
FIG. 16 is a cross sectional side view of the plastic container and liquid dispensing apparatus of FIG. 15, according to the principles of the present disclosure.
Figure 17:
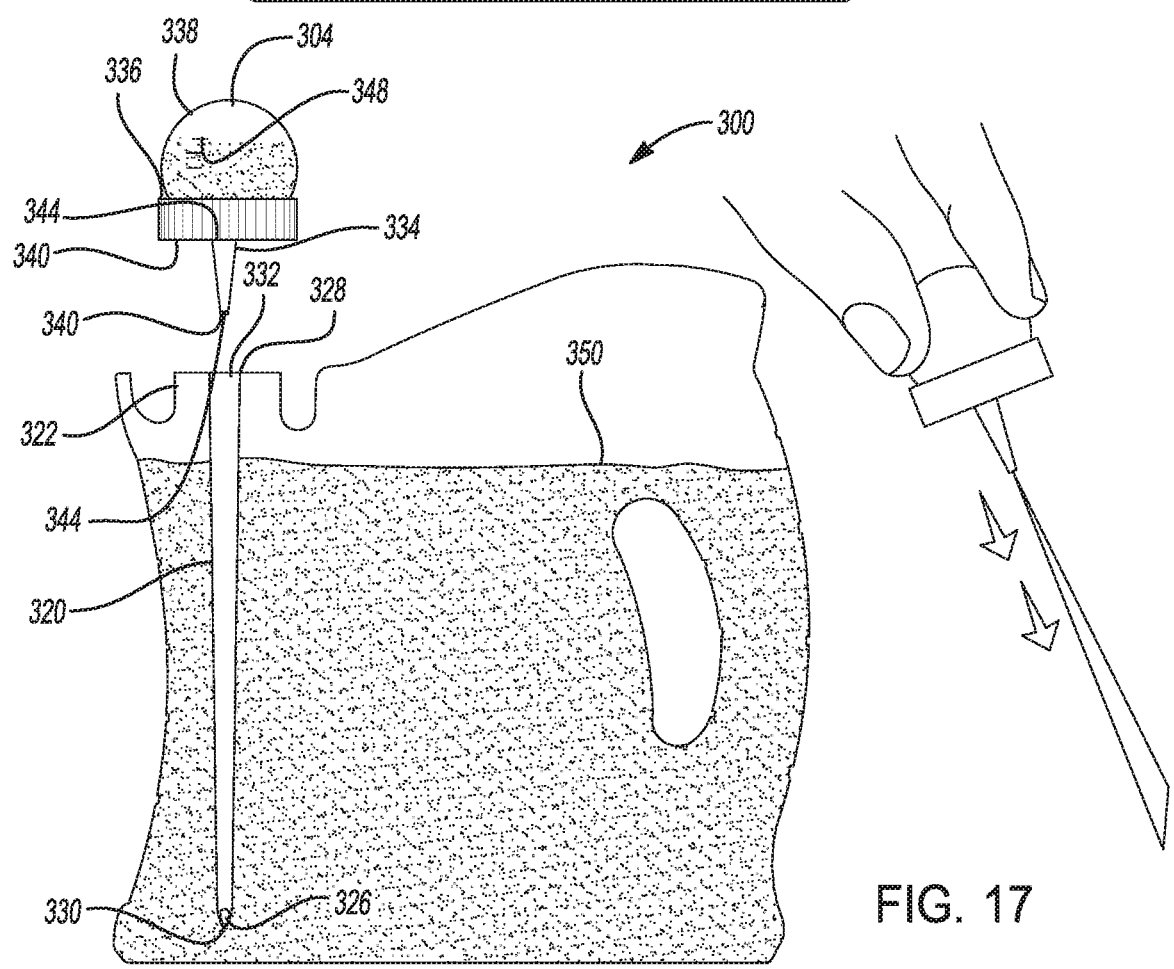
FIG. 17 is a cross sectional side view of the plastic container and liquid dispensing apparatus of FIG. 15 in various stages of operation, according to the principles of the present disclosure.

Turning now to FIGS. 15-17, another example of a plastic container and dispensing apparatus 300 is illustrated and will now be described. The plastic liquid container and dispensing apparatus 300 includes a plastic container 302 and a dispensing apparatus 304. The plastic container 302 includes a base 306, a body 308, and a dispensing portion 310. The body 308 may have a generally aesthetic design; however, most examples will include a handle 312 and a label portion 314. More specifically, the handle 312 includes integrated ribs 316 and a radius portion 318. The integrated ribs 316 provide strength to the handle 312 and the radius portion 318 follows the shape of the label portion 314. The dispensing portion 310 of the plastic container 302 is disposed at the top of the plastic container 302 opposite the handle 312 and includes a siphon tube 320, a threaded vertical wall 322, and a cap 324. The siphon tube 320 includes a first end 326 and a second end 328 opposite the first end 326. The ends 326, 328 of the siphon tube 320 each have a port 330, 332 such that the interior of the plastic container 302 is in communication with the exterior of the plastic container 302 through the siphon tube 320. The cap 324 includes a hinge 325 and a retainer portion 327 and is hinged to the dispensing portion 310 of the plastic container 302 and operable to snap tight to the dispensing portion 310 locking the dispensing apparatus 304 in place while being capable of swinging clear of the dispensing portion 310 thus allowing the dispensing apparatus 304 to be removed from the dispensing portion 310.

The dispensing apparatus 304 is disposed on the dispensing portion 310 of the plastic container 302. The dispensing apparatus 304 includes a pick-up tube 334, a threaded collar 336, and a collapsible squeeze ball 338. The pick-up tube 334 is a gradually narrowing tube having a first end 340 and a second end 342 opposite the first end 340. The first end 340 has an opening 344 so that the interior of the pick-up tube 334 is in communication with the interior of the siphon tube 320 of the plastic container 302. The second end 342 is captured or retained by the threaded collar 336 and includes an opening 346 to the interior of the pick-up tube 334. The squeeze ball 338 includes a hollow interior, a collar, and a plurality of gradation markings 348. For example, the collar of the squeeze ball 338 is captured by the threaded collar 336 so that the interior of the pick-up tube 334 is in communication with the interior of the squeeze ball 338. The plurality of gradation markings 348 are disposed on the exterior of the squeeze ball 338 and mark the proper volume of liquid required for a particular application. The squeeze ball 338 may be molded with a non-opaque material so that the liquid level in the squeeze ball 338 can be determined. As FIGS. 16 and 17 details the interior of the plastic container 302 is shown. In this view, it is shown that the exterior of the pick-up tube 334 is sealed against the interior of the syphon tube 320 of the dispensing portion 310 of the plastic container 302. Furthermore, the first end 326 of the pick-up tube 320 of the dispensing portion 310 of the plastic container 302 terminates in close proximity to the base 306 of the container 302. In this regard, the first end 330 of the pick-up tube 320 is below a liquid 350 level of the container 52 until there is a minimal amount of liquid left in the container 302 thus displaying that the pick-up tube 320 is capable of retrieving nearly all of the liquid out of the plastic container 302.

When operating the dispensing apparatus 304, the collar 336 of the dispensing apparatus 304 is threaded onto the dispensing portion 310 of the plastic container 302. The squeeze ball 338 is compressed to force air down the pick-up tube 334, into and down the syphon tube 320, and into the plastic container 302. Next, the squeeze ball 338 is released and expands to draw a measured dose of liquid from the plastic container 302, up the syphon tube 320, the pick-up tube 334, and into the squeeze ball 338. The dispensing apparatus 304 is then twisted off from the dispensing portion 310, the pick-up tube 334 is removed from the plastic container 302, and aimed at the target to dispense liquid coming out of the compressed squeeze ball 338.

The description of the invention is merely exemplary in nature and variations that do not depart from the gist of the invention are intended to be within the scope of the invention. Such variations are not to be regarded as a departure from the spirit and scope of the invention.

I claim:

1. A container apparatus, the container apparatus including: a plastic container having a base portion, a top portion, a body portion, an interior of the plastic container, and a dispenser opening, and wherein the body portion includes a handle having integrated ribs and a radius portion, wherein the dispensing opening of the plastic container is disposed at the top portion of the plastic container opposite the handle, and a liquid dispenser having a non-opaque dosing cap and a pick-up tube, and wherein the liquid dispenser is disposed in the dispenser opening of the plastic container, the pick-up tube has a hollow bore, an open first end, and an open second end opposite the first end, the first end extends inside the body portion of the plastic container, the second end is fixed to the dosing cap, the interior of the plastic container is in communication with an interior of the dosing cap through the first end, the hollow bore, and the second end of the pick-up tube, and a surface of the dosing cap includes measured gradation noting between about one (1) and two (2) ounce measures, and a rigid cover having a hinge and a retainer portion, and wherein the rigid cover is rotatably connected to the dispenser opening via the hinge and selectively encloses the dispenser opening to secure the dosing cap in the dispenser opening.

2. The container apparatus of claim 1, wherein the dosing cap is a squeezable ball.

3. The container apparatus of claim 2, wherein the dispenser opening of the plastic container includes a threaded vertical wall, the liquid dispenser includes a threaded collar, and the liquid dispenser is secured to the dispenser opening of the plastic container via the threaded vertical wall and the threaded collar.

4. The container apparatus of claim 1, further including a rigid cover having a hinge and a retainer portion, and wherein the rigid cover is rotatably connected to the dispenser opening via the hinge and selectively encloses the dispenser opening to secure the dosing baU ca£ in the dispenser opening.

5. The plastic container and liquid dispenser apparatus of claim 1, wherein the dosing cap is rigid, the dispensing apparatus further includes a locking flange fixed to the dosing cap, and the dispensing apparatus draws liquid from the interior of the plastic container into the dosing cap as the dispensing apparatus is moved through each of three positions.

6. The plastic container and liquid dispenser apparatus of claim 1, wherein the interior of the plastic container further includes a siphon tube having an open first and second end, the first end is disposed proximate the base of the plastic container, the second end is fixed to the dispenser opening, and the pick-up tube of the liquid dispenser is disposed and sealed into the siphon tube.

7. A container apparatus, the container apparatus including: a plastic container having a base portion, a top portion, a body portion, an interior of the plastic container, and a dispenser opening, and wherein the body portion includes a handle having integrated ribs and a radius portion, wherein the dispensing opening of the plastic container is disposed at the top portion of the plastic container opposite the handle, and the dispenser opening of the plastic container includes a threaded vertical wall; a liquid dispenser having a non-opaque dosing cap, a threaded collar, and a pick-up tube, and wherein the liquid dispenser is secured to the dispenser opening of the plastic container via the threaded vertical wall and the threaded collar, the pick-up tube has a hollow bore, an open first end, and an open second end opposite the first end, the first end extends inside the body portion of the plastic container, the second end is fixed to the dosing cap, the interior of the plastic container is in communication with an interior of the dosing cap through the first end, the hollow bore, and the second end of the pick-up tube, and a surface of the dosing cap includes measured gradation noting between about one (1) and two (2) ounce measures, and a rigid cover having a hinge and a retainer portion, and wherein the rigid cover is rotatably connected to the dispenser opening via the hinge and selectively encloses the dispenser opening to secure the dosing cap in the dispenser opening.

8. The container apparatus of claim 7, wherein the dosing cap is a squeezable ball.

9. The plastic container and liquid dispenser apparatus of claim 7, wherein the hollow cap is rigid, the dispensing apparatus further includes a locking flange fixed to the hollow cap, and the dispensing apparatus draws liquid from the interior of the plastic container into the hollow cap as the dispensing apparatus is moved through each of three positions.

10. The plastic container and liquid dispenser apparatus of claim 7, wherein the interior of the plastic container further includes a siphon tube having an open first and second end, the first end is disposed proximate the base of the plastic container, the second end is fixed to the dispenser opening, and the pick-up tube of the liquid dispenser is disposed and sealed into the siphon tube.

* * * * *